3,058,772
LOG BUNK STAKE AND LOCKING AND RELEASING MECHANISM
James Nottingham Gourley, Box 604, Sutherlin, Oreg.
Filed July 5, 1960, Ser. No. 40,874
1 Claim. (Cl. 296—43)

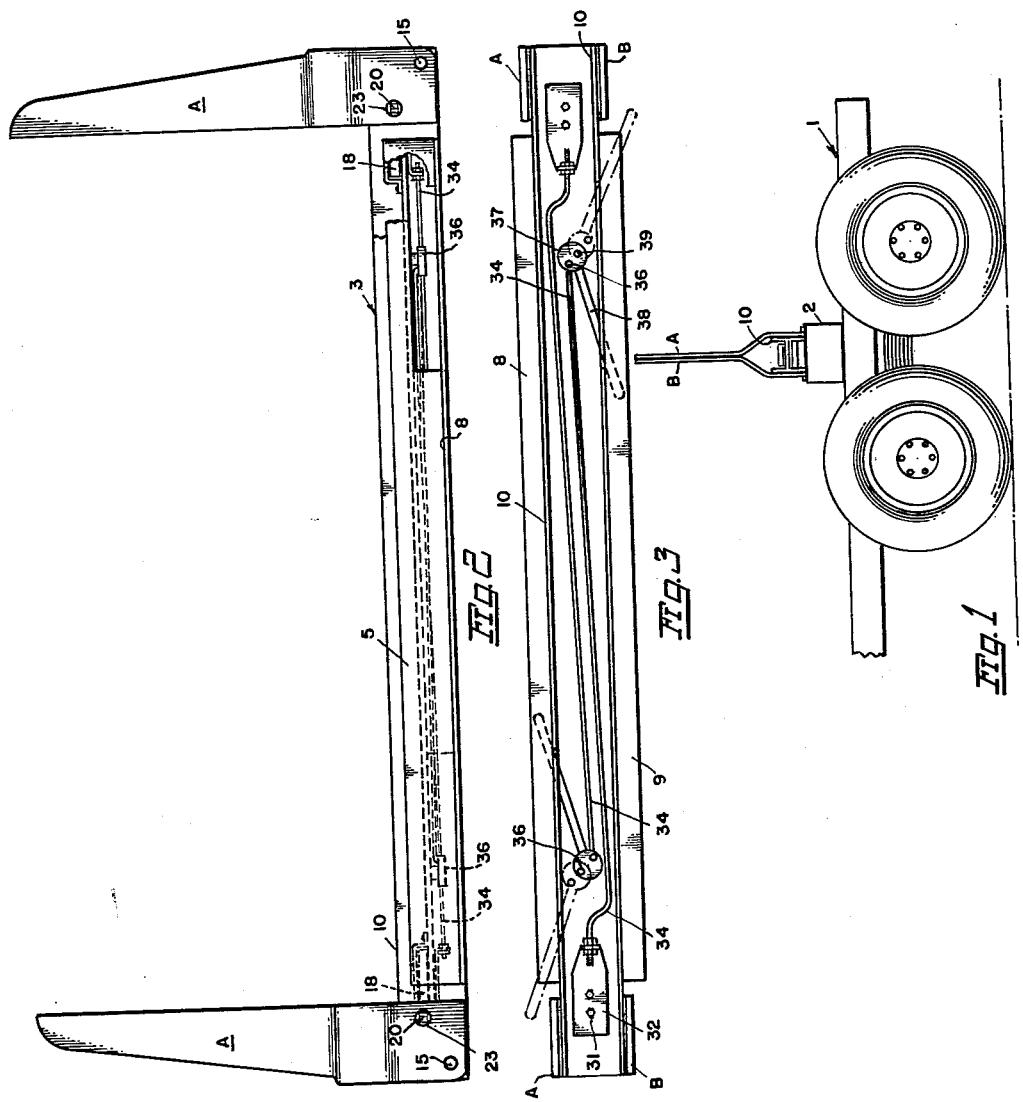

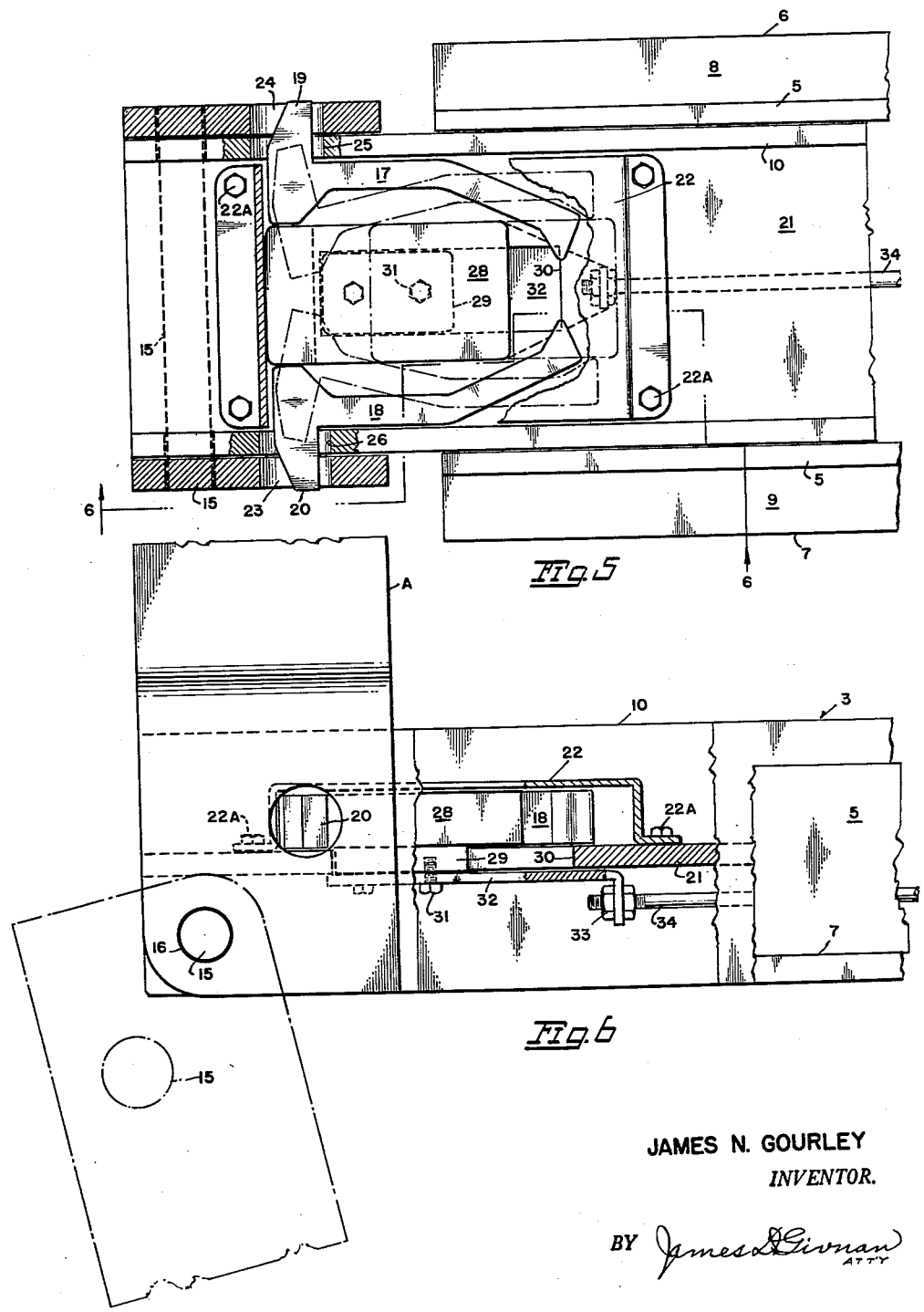

This invention relates to improvements in log bunks and bunk stakes for logging trucks and the like.

It is one of the principal objects of the invention to provide an assembly of the character described which is of simple, rugged, economical construction involving a minimum of parts and wherein the bunk stake on one end of the bunk can only be operated from the other end thereof from a locked, vertical, closed position to a downwardly swung open position for selectively unloading logs from either side of the logging truck.

A further object of the invention is the provision of a bunk stake which is positive and foolproof and which is operable with absolute safety to the operator, since the bunk stake can only be operated from that end of the bunk which is opposite to the end from which the logs are rolled off the truck when the bunk stake is unlocked and has swung into an open position.

A still further object is the provision of means for locking the actuating means for the bunk stake locks against accidental or unintentional operation.

The foregoing and other objects and advantages which will become subsequently apparent reside in the details of construction and operation as more fully hereinafter described and claimed, reference being had to the accompanying drawings forming a part hereof and in which:

FIGURE 1 is a fragmentary side elevational view of a logging truck provided with a log bunk and bunk stakes made in accordance with my invention.

FIGURE 2 is an elevational view on an enlarged scale of the bunk and bunk stakes removed from the logging truck and within a fragment broken away to reveal internal parts.

FIGURE 3 is a bottom plan view of FIGURE 2.

FIGURE 4 is an elevational view of the left hand end of FIGURE 2.

FIGURE 5 is a fragmentary top plan view on an enlarged scale of one end of the log bunk and a typical bunk stake with fragments broken away and parts in section for clearness of illustration.

FIGURE 6 is an sectional side elevational view taken approximately along the line 6—6 of FIGURE 5.

With continuing reference to the drawings wherein like reference characters designate like parts and particularly to FIGURE 1 thereof, reference numeral 1 indicates generally the chassis of a logging truck provided with a cross beam 2 near its rearward end and with one at its forward end, not shown, all in the conventional manner.

The log bunk of my invention comprises an H-beam indicated generally at 3 secured by welding or the like to the vertical flanges 5 of angle irons 6 and 7 whose lateral flanges 8 and 9 are bolted or otherwise secured in any suitable manner to the cross member 2 of the truck chassis 1.

The bunk stakes of this invention are identical and each is made of two plates A and B which are welded or otherwise secured together and separated at their bottom ends, as shown, to straddle the ends of the vertical flanges 10 of the H-beam 3. Each stake is hingedly attached to its respective end of the H-beam by means of a pin 15 extending through openings 16 in the outside bottom corners of the divided portion of the stake and through similar openings in the bottom corners of the flanges 10 of the H-beam below the web 21 thereof.

For locking the bunk stakes in their vertical load-carrying positions as shown, I have provided (see FIGS. 5 and 6) a locking mechanism comprising a pair of detents 17 and 18 in the form of locking bolts substantially arcuate in plan view and provided with heads 19 and 20 respectively. The detents rest upon the top of the web 21 of the H-beam and are covered and protected by a housing in the form of cover plate 22 secured as at 22A to the web. At a point above and inwardly from the openings 16 are aligned openings 23 and 24 in the bunk stake and 25 and 26 in the flanges of the H-beam. The detents are movable inwardly from the locking position shown in full lines with their heads extending into the openings 23 and 24 in the bunk stake to the retracted broken line portion with their heads withdrawn inwardly from said openings.

Such spreading and retracting movement of the detents is effected by what might be termed a cam plate 28 movable lengthwise within the confines of the cover plate 22 and guided in such movement by a depending central portion 29 slidable within and lengthwise of a rectangular opening 30 in the web 21 of the H-beam. The depending portion of the cam plat 28 is secured as at 31 to a shifting plate 32 adjustably attached to one end of a push-pull rod 34 whose opposite end (see FIG. 3) is pivotally connected as at 36 to one side of a cam disk 37 provided with an actuating handle 38 and pivotally attached as at 39 to the underside of the web 21 of the H-beam.

From the foregoing, the operation of my invention will be readily understood. When it is desired to unload stacked logs from the left hand side of the log bunk as viewed in FIGURE 2, the actuating handle 38 at the right hand side thereof is swung from the full line position to the broken line position and the resultant rotation of the cam disk 37 through the medium of the push-pull rod 34 will pull the cam plate 28 into the broken line position shown in FIGURE 5 which will force the inner ends of the detents outwardly and their outer ends inwardly and thus withdraw the heads 19 and 20 of the detents from engagement with the openings 23 and 24 in the separated bottom portion of the bunk stake.

When either stake is thus released, it will swing downwardly into the broken line position shown in FIGURE 6 allowing the logs to roll off the log bunks at one end thereof and away from an operator stationed at the opposite end.

While I have shown a particular form of embodiment of my invention, I am aware that many minor changes therein will readily suggest themselves to others skilled in the art without departing from the spirit and scope of the invention.

Having thus described my invention what I claim as new and desire to protect by Letters Patent is:

A log bunk and a bunk stake at each end of the log bunk, said log bunk comprising an H-beam having vertical side flanges and a flat web therebetween, said beam adapted for securement to the chassis of a logging truck transversely thereof, each of said bunk stakes having a top end and a bottom end and bifurcated at its bottom end to thereby straddle said vertical flanges of the H-beam at its respective end thereof, a hinge pin extending through the bottom end of each bunk stake and through the flanges of the H-beam below the web thereof, a pair of detents each of substantially arcuate shape in plan view movably laterally mounted on said web at each end of the beam with the concave sides opposing each other to provide a space between the detents in each pair, each detent having an outwardly extending head at one of its ends, a housing covering each pair of detents, detent-actuating means slidably mounted within the housing and upon the web between each pair of detents within said space therebetween, said bifurcated bottom end of each stake having openings therethrough normally aligned with openings in the flanges of the H-beam above the web thereof for the reception of said heads of the detents, manually operable means at each end of the beam and connected to said detent-actuating means at the opposite end thereof, whereby movement of said detent actuating means in one direction will spread the head end of said detents to project their heads through said openings in the flanges of the beam and into said openings in said bottom end of the bunk stakes for locking the same in a vertical position relative to the beam, and whereby movement of the detent-actuating means in an opposite direction will spread the opposite ends of said detents to withdraw their heads from said openings in the bunk stakes to thereby permit the bunk stakes to swing downwardly about said hinge pins to an open position.

References Cited in the file of this patent

UNITED STATES PATENTS

| | | |
|---|---|---|
| 2,518,974 | Busenius | Aug. 15, 1950 |
| 2,661,235 | Isachsen | Dec. 1, 1953 |
| 2,900,194 | De Lay | Aug. 18, 1959 |
| 2,950,125 | Dodds | Aug. 23, 1960 |

FOREIGN PATENTS

| | | |
|---|---|---|
| 119,265 | Sweden | July 15, 1947 |